Dec. 5, 1950  J. N. WEILAND  2,532,381
CLUTCH AND BRAKE MECHANISM
Filed Sept. 1, 1948  3 Sheets-Sheet 1
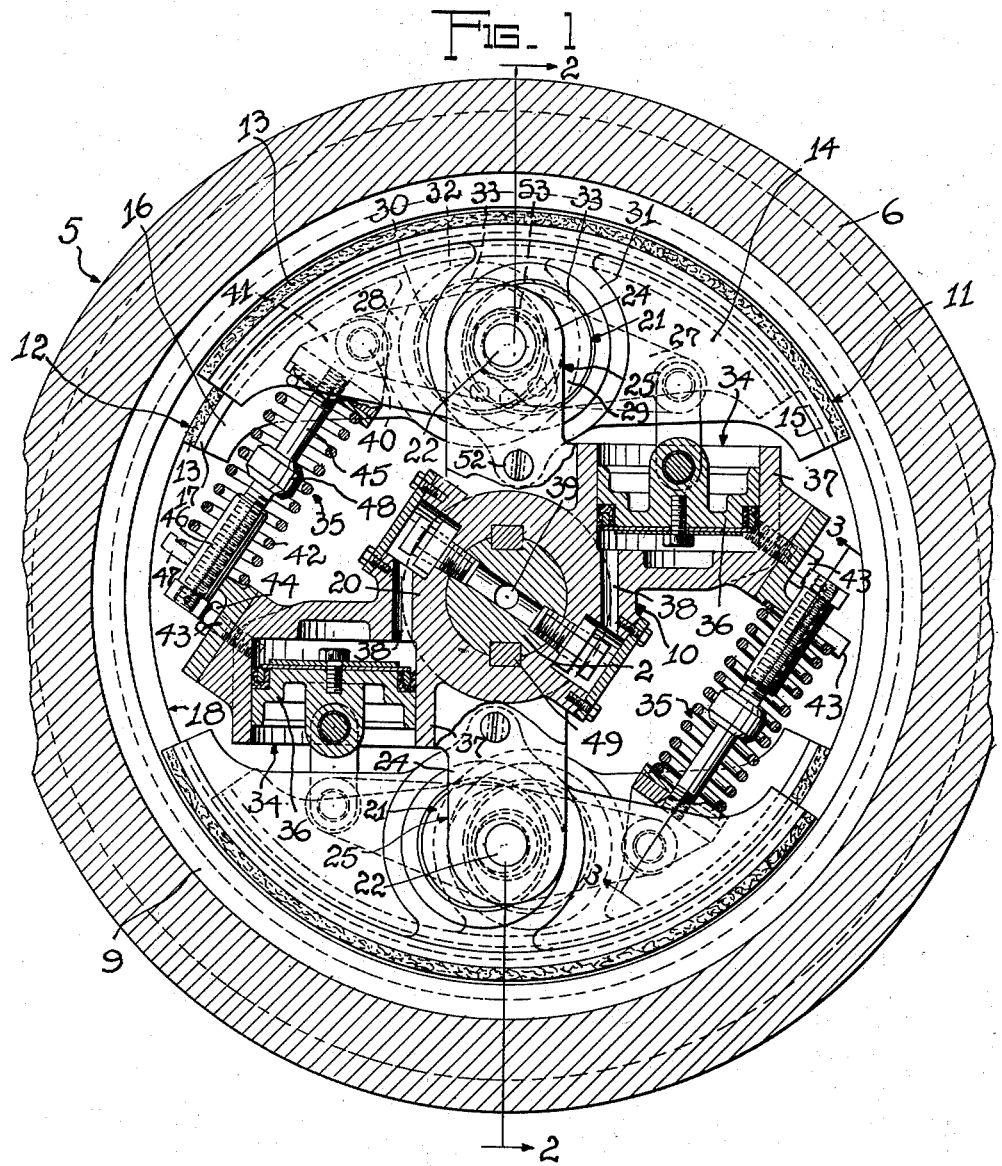
INVENTOR.
JOHN N. WEILAND
BY
Gustav A. Wolff
ATT

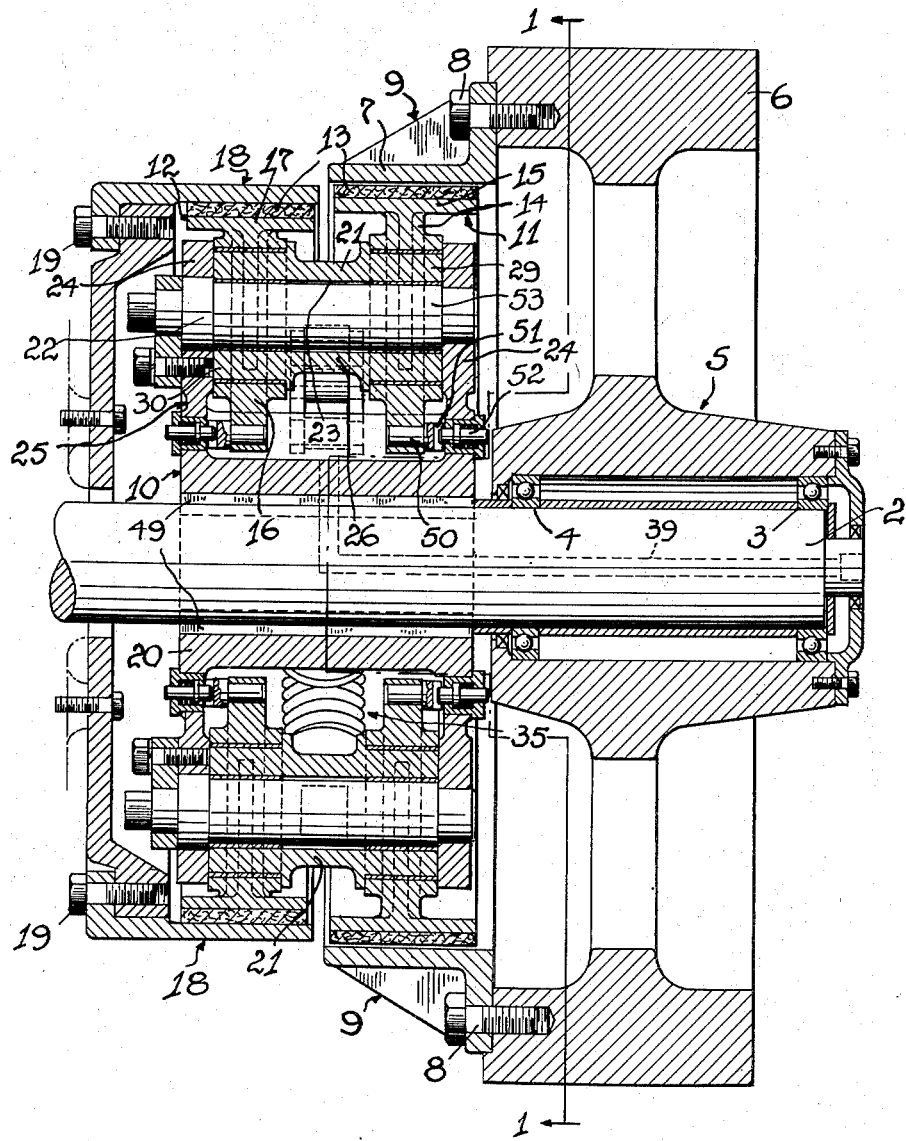

Dec. 5, 1950     J. N. WEILAND     2,532,381
CLUTCH AND BRAKE MECHANISM
Filed Sept. 1, 1948     3 Sheets-Sheet 3
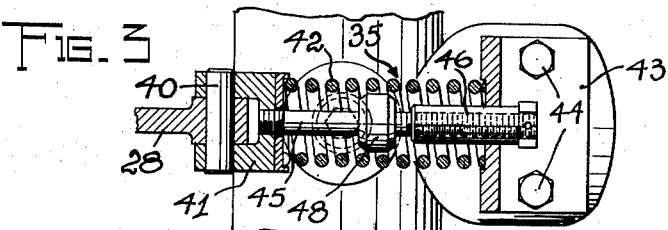
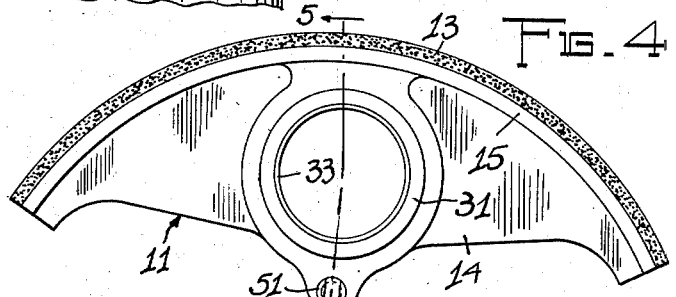
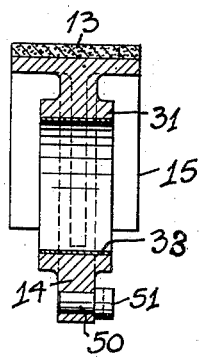
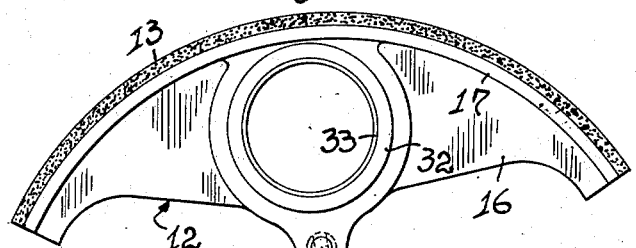
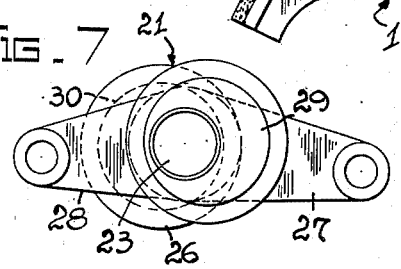
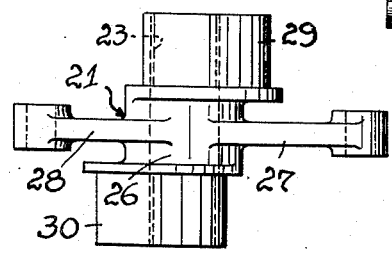
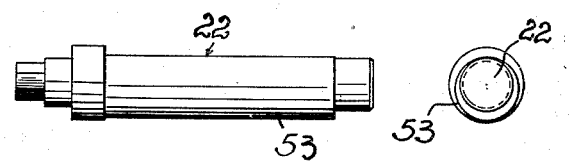
INVENTOR.
JOHN N. WEILAND
BY
Gustav A. Wolff
ATT.

Patented Dec. 5, 1950

2,532,381

UNITED STATES PATENT OFFICE 2,532,381

CLUTCH AND BRAKE MECHANISM

John N. Weiland, Cleveland, Ohio, assignor to The Cleveland Punch & Shear Works Co., Cleveland, Ohio, a corporation of Ohio Application September 1, 1948, Serial No. 47,205

13 Claims. (Cl. 192—17)

This invention relates to a clutch and brake mechanism for power presses and other driven machines with continuously driven fly-wheels —which machines through a clutch mechanism transmit the rotary motion and energy of their driven fly-wheels to parts to be driven and arrest the motion of the driven parts by a brake mechanism actuated when the clutch mechanism is inactivated—and is an improvement over my copending applications Ser. No. 745,517, filed May 2, 1947, now Patent No. 2,458,664, dated January 11, 1949, and Ser. No. 768,386, filed August 13, 1947, now Patent No. 2,527,865, dated October 31, 1950, which provide a clutch and brake mechanism having lever actuated unitary clutch and brake shoe members adapted to be selectively shifted in opposite directions for selective clutching and braking action of the unitary clutch and brake shoe members.

The primary object of the present invention is the provision of a combined clutch and brake mechanism for machines of the type referred to above, which mechanism includes individual, shiftable clutch shoe members, individual, spring pretensioned brake shoe members, and supporting and shifting means mounting and actuating both the clutch shoe members and the brake shoe members, the supporting and shifting means being pivotally supported and constructed to effect selective clutching and braking action of the shoe members when the supporting and shifting means are shifted on their pivots in opposite directions.

Another object of the invention is the provision of a combined clutch and brake mechanism for machines of the type referred to above, which mechanism includes individual, substantially radially shiftable clutch shoe members; individual, substantially radially shiftable spring pretensioned brake shoe members; and, pivotally supported shifting means having eccentric portions rotatably coupled with said clutch and brake shoe members, the eccentric portions being offset with respect to each other to effect selective clutching and braking action of the shoe members when the shifting means are shifted on their pivots in opposite directions.

A further object of the invention is the provision of a combined clutch and brake mechanism for machines of the type referred to above, which mechanism includes individual, substantially radially shiftable clutch shoe members; individual, substantially radially shiftable spring pretensioned brake shoe members; and, fluid operated dual lever means having eccentric portions rotatably mounting the clutch shoe members and brake shoe members, the dual lever means when shifted in either direction being adapted to effect shifting of the clutch shoe means in one direction and shifting of the brake shoe means in the opposite direction to effect selective action of the clutch and brake shoe means for selective clutching or braking purposes.

With these and incidental objects in view which will appear hereinafter, the invention consists in certain other novel features of construction and combination of parts, the essential elements of which are set forth in the appended claims; and a preferred form of embodiment of the invention is hereinafter shown with reference to the drawings accompanying and forming part of the specification.

In the drawings:

Fig. 1 is a transverse, sectional view through a fluid-operated clutch and brake mechanism constructed in accordance with the invention, the mechanism being shown attached to and coupled with the driven shaft and fly-wheel of a power driven machine, such as a power press, the section being taken on line 1—1 of Fig. 2 of the drawings;

Fig. 2 is a transverse, cross-sectional view through the fluid-operated clutch and brake mechanism shown in Fig. 1, the section being taken on line 2—2 of Fig. 1;

Fig. 3 is a fragmentary view on line 3—3 of Fig. 1;

Fig. 4 is a side view of a clutch shoe member;

Fig. 5 is a cross-sectional view on line 5—5 of Fig. 4;

Fig. 6 is a side view of a brake shoe member;

Fig. 7 is a side view of an actuating lever pivotally mounting a clutch and a brake shoe member;

Fig. 8 is a bottom view of the actuating lever shown in Fig. 7;

Fig. 9 is a side view of a pin member pivotally connecting an actuating lever with the base member of the clutch and brake mechanism; and Fig. 10 is an end view of the pin member shown in Fig. 9.

Referring now in detail to the exemplified form of the invention shown in the drawings, reference numeral 2 denotes the crank-shaft of a power driven machine such as a power press, which shaft freely rotatably mounts in ball bearings 3 and 4 a fly-wheel 5 driven in any suitable manner. Fly-wheel 5 has attached to its rim portion 6, secured thereto by screw members 8, a circumferential flange member 7, which flange member has angular cross section and forms a clutch drum 9 for a clutch and brake mechanism 10 mounted on crank-shaft 2. The clutch and brake mechanism includes two oppositely arranged shiftable clutch shoe members 11 and two oppositely arranged shiftable brake shoe members 12. Clutch shoe members 11, which are of substantially T-shaped cross section, include each a web portion 14 and a circular, arc-like flange 15 integrally extended from said web portion and cooperating in clutching operations with the inner surface of clutch drum 9 on fly wheel 5, and brake shoe members 12 which are of substantially T-shaped cross section include each a web portion 16 and a circular arc-shaped flange 17 cooperating with the inner surface of a brake drum 18 secured to the frame of the power driven machine by bolts 19.

The clutch shoe members 11 and the brake shoe members 12, which are of substantially equal construction with the exception that the radii of the arcs of the clutch shoe members are somewhat larger than the radii of the arcs of the brake shoe members for a purpose later to be described, have their circular arc-like flanges 15 and 17 lined with brake-lining 13 to insure the desired clutching and braking action with clutch drum 9 and brake drum 18, respectively. Clutch shoe members 11 and brake shoe members 12 are coordinated to each other and shiftably coupled with a base member 20 by actuating levers 21, which are pivotally connected to base member 20 by pin members 22 extended through bores 23 in the actuating levers and ear portions 24 of fork-shaped extensions 25 on base member 20. These levers each include a central portion 26, lever arms 27, 28 and circular eccentric studs 29, 30 extended from central portion 26 at right angles to lever arms 27 and 28. The eccentric studs 29 and 30 of each actuating lever 21 are eccentrically arranged with respect to the axis of bore 23 in symmetrical relation with respect thereto. Circular stud 29 rotatably supports a single clutch shoe member 11 and circular stud 30 rotatably supports a single brake shoe member 12. For such purpose clutch and brake shoe members 11 and 12 are provided with bearing portions 31, 32 which are lined with bearing sleeves 33 fitting the circular eccentric studs 29 and 30.

A pivotal movement of each pivotally supported actuating lever 21 effects shifting of the respective clutch and brake shoe members in opposite directions into and out of engagement with clutch drum 9 and brake drum 18. This pivotal movement of an actuating lever is effected by a fluid-operated shifting device 34 which is coupled with the lever arm 27 and a spring assembly 35 which is coupled with lever arm 28. Lever arm 27 is slightly longer than lever arm 28 and is linked to piston 36 of the fluid-operated shifting device 34 having its cylinder 37 formed as an integral part of base member 20. Shifting of the fluid-operated device is effected in one direction when fluid enters cylinder 37 through a passage 38 in the bottom wall of said cylinder. This passage is in open communication with a bore 39 in shaft 2 and permits feeding of fluid into cylinder 37 so as to force piston 36 outwardly and effect outward movement of clutch shoe member 11 by eccentric stud 29 and into clutching engagement with clutch drum 9, and inward shifting of brake shoe member 12 to release its braking engagement with brake drum 18. The lever arm 28 is pivoted to the pretensioned spring assembly 35 to effect tensioning of the spring assembly in the above described movement.

The pretensioned spring assembly 35 effects shifting of actuating lever 21 in an opposite direction when the fluid pressure in cylinder 37 is released and fluid contained in said cylinder is permitted to be discharged therefrom through passage 38 and bore 39 in any suitable manner. This spring assembly is pivoted to lever arm 28 by pin 40 extended through a clevis 41 and lever arm 28 and embodies an elongated compression spring 42 which is seated between said clevis and an L-shaped slotted bracket 43 attached to base member 20 by bolts 44. A guide rod 45, threadably engaged with clevis 41, carries at its free end an elongated nut member 46 which is slidably extended through a slot 47 in bracket 43. Guide rod 45 is formed with an enlargement 48 permitting proper guiding of the pretensioned compression spring 42.

The clutch and brake mechanism described is particularly well suited for high speed punch presses and other machines rotating their moving parts at more than 400 R. P. M. as the power necessary for quick and proper braking action is proportionate to the centrifugal force created by rotation of the mechanism, so that relatively light springs may readily be used in the pretensioned spring assembly to decrease the counteracting forces of the spring assembly during shifting of the clutch and the brake shoe members from clutching action to braking action.

In operation, when the described clutch and brake mechanism is used as described on a power press with a crank-shaft 2, fly-wheel 5, according to common practice is continuously driven by a motor pulley and belt arrangement (not shown). Starting of the press is effected by feeding fluid into cylinder 37 to shift piston 36 and therewith rotate actuating lever 21 in counterclockwise direction against the force of pretensioned spring assembly 35. The pivots for such movement of levers 21 are pins 22 pivoting levers 21 to base member 20 rigidly mounted on crank-shaft 2 by a key member 49. This movement of levers 21 effects outward movement of the clutch shoe members 11 for frictional clutching engagement with the clutch drum 9 and inward movement of brake shoe members 12 for release of their braking action with brake drum 18. The clutching engagement transfers the rotary movement of fly-wheel 5 through clutch shoe members 11 to crank-shaft 2 by means of actuating levers 21, pin members 22 and base member 20 to crank-shaft 2. In the clutching position of the mechanism the brake shoe members 12 have their lined flanges 17 disengaged from frictional contact with brake drum 18 and pretensioned compression springs 42 are additionally tensioned. Disengagement of the clutching action of the clutch shoe members 11 with clutch drum 9 is automatically effected by release of the pressure fluid from cylinder 37. Such a release may be induced in any customary manner and permits compression springs 42 to rotate the actuating lever 21 in a clockwise direction to effect shifting of the clutch shoe members inwardly and out of frictional clutching contact with the clutch drum and shifting of the brake shoe members outwardly into frictional braking contact with the brake drum so as to stop rotation of base member 20 and the crank-shaft 2 mounting same.

The radii of the circular arc-like flanges 15 of the clutch shoe members 11 are somewhat larger than the radii of the flanges 17 of the brake shoe members 12 to permit quick and efficient assembly and disassembly of the clutch and brake mechanism for repair work.

To avoid tilting and dragging of the shoe members when disengaged from their respective clutch and brake drums, each shoe member carries in its web portion 14 and 16, respectively, near the central bottom portion thereof, a guide pin 50 having its grooved or slotted head 51 engaged by a spring-pressed plunger 52 which is mounted in the pin-supporting ear portions 24 of the fork-shaped extension 25 on base member 20.

Adjustment of the clutch and brake mechanism in case of wear of the brake linings 13 on clutch and brake shoes 11 and 12 is readily effected by rotation of pin 22. For such purpose, pin 22 includes a central eccentric portion 53 fitting the bore 23 in actuating lever 21 and adapted to effect by rotation of the pin 22 outward shifting of the respective actuating lever 21 to bring the clutch and brake shoes back into proper position for efficient and quick clutching and braking operations.

Having thus described my invention, what I claim is:

1. In a clutch mechanism a circular driving member, a second circular member arranged coaxial with said first member, a third member arranged coaxial with said first two members, individual friction shoes cooperating with said first member, individual friction shoes cooperating with said second member, and lever means pivotally coupled with the central portions of said friction shoes for pivotally supporting said friction shoes for said first and second members, said lever means being pivoted to said third member and including symmetrically arranged circular eccentric portions adapted to pivotally mount the said friction shoes and positively shift same in opposite directions with respect to each other when the lever means are rocked on their pivots on said third member.

2. In a clutch mechanism a circular driving member, a second circular member arranged coaxial with said first member, a third member arranged coaxial with said first two members, individual friction shoes cooperating with said first member, individual friction shoes cooperating with said second member, and lever means pivotally coupled with the central portions of said friction shoes for pivotally supporting said friction shoes, said lever means being pivotally coupled with said third member and eccentrically pivotally coupled with the said friction shoes to effect, by rocking of the lever means on their pivots, simultaneous positive shifting of the friction shoes in directions opposite with respect to each other.

3. In a clutch and brake mechanism a driving member, a driven member, means affording a stationary braking surface, individual clutch shoe means, individual brake shoe means, a lever structure pivotally connected with said driven member, and symmetrically arranged coupling members on said lever structure eccentrically positioned with respect to its pivot and freely rotatably mounting said clutch shoe means and said brake shoe means to effect, by rocking of said lever structure on its pivot, positive substantially radial shifting of said clutch shoe means and said brake shoe means in opposite directions with respect to each other for selective clutching and braking engagement of the respective shoe means with said driving member and said stationary braking surface.

4. A clutch and brake mechanism as described in claim 3, including cooperating guiding means on said shoe means and said driving member adapted to prevent tilting of said shoe means on the coupling members of said lever structure.

5. A clutch and brake mechanism as described in claim 4 wherein said guiding means consist of pin members rotatably mounted in said shoe means and provided with slotted heads and spring-pressed plungers supported by said driven members and extended into the slotted heads of said pin members.

6. A clutch and brake mechanism as described in claim 3, wherein said lever structure embodies a body having an axial bore for pivotally connecting the body to said driven member, two arm portions extended from opposite sides of said body portion adapted to be coupled to actuating means, and two stud portions extended from said body in symmetrical, parallelly offset arrangement with respect to its axial bore, said stud portions being adapted to pivotally mount the clutch and the brake shoe means.

7. In a clutch and brake mechanism a driving member, a driven member, means affording a stationary braking surface, individual clutch shoe means, individual brake shoe means, a lever structure pivotally connected with said driven member, coupling stud members on said lever structure eccentrically and symmetrically arranged with respect to its pivot, one of said coupling stud members freely rotatably mounting said clutch shoe means and the other one of said coupling stud members freely rotatably mounting said brake shoe means, and actuating means coupled with said lever structure adapted to rock same on its pivot in opposite directions, said lever structure when shifted by said actuating means effecting substantially radial, positive shifting of said clutch and said brake shoe means in opposite directions with respect to each other for selective clutching and braking engagement of the respective shoe means with said driving member and said stationary braking surface.

8. In a clutch and brake mechanism a driving member, a driven member, means affording a stationary braking surface, individual clutch shoe means, individual brake shoe means, a lever structure pivoted to said driven member including eccentric, symmetrically arranged stud means pivotally supporting said clutch shoe means and said brake shoe means, and two actuating devices for said lever structure, said actuating devices including fluid-operated means and pretensioned spring means cooperating in racking said lever structure to effect simultaneous positive shifting of said clutch shoe means and said brake shoe means in opposite directions with respect to each other in selected opposed directions for selective clutching and braking engagement with said driving member and said stationary surface.

9. In a clutch and brake mechanism a driving member, a driven member, means affording a stationary braking surface, a plurality of symmetrically arranged individual clutch shoe means, a plurality of symmetrically arranged individual brake shoe means, a plurality of symmetrically arranged lever structures each being pivotally coupled with said driven member, each lever structure including two symmetrically arranged stud portions arranged parallel to its pivot axis in laterally offset relation with respect thereto, and each lever structure having one of its stud portions rotatably supporting a clutch shoe means and the other one of its stud portions rotatably supporting a brake shoe means, and actuating devices for simultaneously rocking said lever structures in opposite directions for positive selective shifting of the clutch shoe means and brake shoe means in opposite directions with respect to each other.

10. In a clutch and brake mechanism a driving member, a driven member having a fork-shaped extension, means affording a stationary braking surface, clutch shoe means, brake shoe means, a lever structure pivoted between the arms of the extension member of said driven member, a pin rotatably adjustably mounted in the arms of said extension member including an eccentric portion extended through a bore in the lever structure and adapted to shift same by rotation of said pin, and coupling members on said lever structure eccentrically arranged with respect to its bore and rotatably coupled with said clutch and said brake shoe means to effect, by rocking of said lever structure, substantial radial shifting of the clutch and the brake shoe means in opposite directions with respect to each other for selective clutching and braking engagement of the respective shoe means with said driving member and said stationary surface.

11. The combination of a power driven machine having a frame, a crank-shaft and a fly-wheel with a clutch and brake mechanism mounted on said crank-shaft adjacent to said fly-wheel and coaxial therewith, said clutch and brake mechanism including a clutch drum secured to said fly-wheel, a driven member secured to said crank-shaft, a brake drum secured to said frame, individual clutch shoe means, individual brake shoe means, a lever structure pivotally connected with said driven member, coupling stud members on said lever structure eccentrically and symmetrically arranged with respect to its pivot and freely rotatably coupled with said clutch and said brake shoe means, and actuating means coupled with said driven member and said lever structure to effect rocking of said lever structure in opposite directions for simultaneous positive shifting said clutch shoe means and said brake shoe means in opposite substantially radial directions with respect to each other into selective clutching engagement with said clutch drum member and selective braking engagement with said braking drum member.

12. The combination of a power driven machine as described in claim 11 wherein the clutch drum is an open ring larger in diameter than the brake drum and removably secured to the rim of the fly-wheel to permit lateral shifting of the clutch drum and exposure of the clutch shoe means by sliding same over the brake drum and wherein the brake drum is an open ring removably secured to a flange of the frame to permit its lateral shifting for open exposure of the brake shoe means.

13. A clutch and brake mechanism as described in claim 7, wherein said lever structure embodies a body having an axial bore for pivotally connecting the body to said driven member, two arm portions extended from opposite sides of said body portion adapted to be coupled to actuating means, and two stud portions extended from said body in symmetrical, parallelly offset arrangement with respect to its axial bore, said stud portions being adapted to pivotally mount the clutch and the brake shoe means.

JOHN N. WEILAND.

REFERENCES CITED

The following references are of record in the file of this patent:

UNITED STATES PATENTS

| Number | Name | Date |
|---|---|---|
| 2,458,664 | Weiland | Jan. 11, 1949 |

FOREIGN PATENTS

| Number | Country | Date |
|---|---|---|
| 377,863 | Germany | June 28, 1923 |